(12) United States Patent
El-Bkaily et al.

(10) Patent No.: US 10,543,726 B2
(45) Date of Patent: Jan. 28, 2020

(54) LOWER CONTROL ARM

(71) Applicant: Ford Global Technologies, LLC, Dearborn, MI (US)

(72) Inventors: Marwan El-Bkaily, Canton, MI (US); Michael Chang, Novi, MI (US); Tushar Kamble, Farmington, MI (US); Peter J. Jargowsky, Canton, MI (US); David Lee, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 15/713,899

(22) Filed: Sep. 25, 2017

(65) Prior Publication Data

US 2019/0092114 A1    Mar. 28, 2019

(51) Int. Cl.
*B60G 7/02* (2006.01)
*B60G 7/00* (2006.01)
*B60G 3/18* (2006.01)

(52) U.S. Cl.
CPC .............. *B60G 7/001* (2013.01); *B60G 7/02* (2013.01); *B60G 3/18* (2013.01); *B60G 2200/156* (2013.01); *B60G 2204/4302* (2013.01); *B60G 2206/012* (2013.01); *B60G 2206/017* (2013.01); *B60G 2206/12* (2013.01); *B60G 2206/124* (2013.01); *B60G 2206/8201* (2013.01); *Y10T 403/452* (2015.01)

(58) Field of Classification Search
CPC . B60G 7/001; B60G 7/00; B60G 7/02; B60G 2206/01; B60G 2206/012; B60G 2206/016; B60G 2206/017; B60G 2206/10; B60G 2206/12; B60G 2206/124; B60G 2206/8201; B60G 2204/4302; B60G 2200/142; B60G 2200/156; B60G 3/18; Y10T 403/452
USPC .................................... 280/124.134–124.152
See application file for complete search history.

(56) References Cited

U.S. PATENT DOCUMENTS

| | | | |
|---|---|---|---|
| 8,628,139 B2 | 1/2014 | van Oirschot et al. | |
| 9,643,651 B2 | 5/2017 | Dressel et al. | |
| 2009/0295113 A1* | 12/2009 | Inoue | B60G 7/001 |
| | | | 280/124.134 |
| 2017/0015264 A1 | 1/2017 | Mohrlock | |
| 2018/0354330 A1* | 12/2018 | Babu | F16F 1/387 |

FOREIGN PATENT DOCUMENTS

| | | |
|---|---|---|
| CN | 102673331 B | 1/2016 |
| CN | 205256440 U | 5/2016 |
| DE | 102012021269 A1 | 4/2014 |
| DE | 102013016766 A1 | 4/2015 |
| KR | 20160063853 A | 6/2016 |
| WO | 2016148633 A1 | 9/2016 |

* cited by examiner

*Primary Examiner* — Keith J Frisby
(74) *Attorney, Agent, or Firm* — Frank A. MacKenzie; Bejin Bieneman PLC

(57) ABSTRACT

A lower control arm includes a body including a body portion and an arm elongated from the body portion, and a sleeve having a tubular shape. The arm includes an end spaced from the body portion, a top surface, and a bottom surface opposite the top surface. The sleeve is fixed to the end. The sleeve includes a slit extending lengthwise that is disposed closer to one of the top surface and the bottom surface than to a middle of the end.

22 Claims, 8 Drawing Sheets

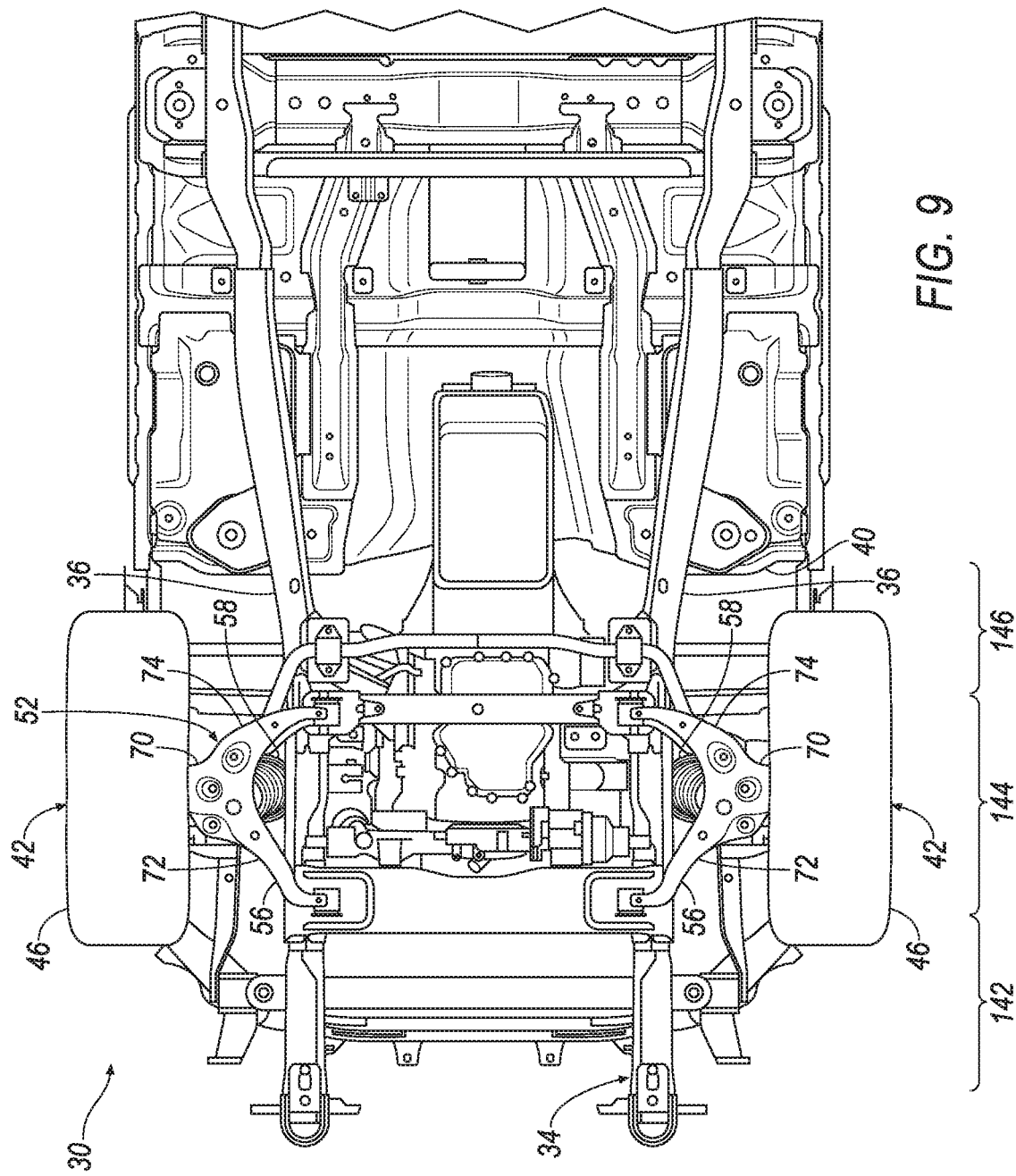

LOWER CONTROL ARM

BACKGROUND

Vehicles typically include suspension systems. The suspension system of a vehicle is coupled to the vehicle frame and to each wheel assembly. The suspension system absorbs and dampens shocks and vibrations from the wheel assemblies to the vehicle frame. For each wheel assembly, the suspension system may include an upper control arm, a lower control arm, a coil spring, and a shock absorber. The shock absorber extends through the coil springs. One end of the shock absorber and the coil spring may be connected to the lower control arm, and the other end of the shock absorber and the coil spring may be connected to the upper control arm or to the vehicle frame.

The suspension system is arranged so that an upward motion of the wheel assembly, such as when the tire hits a bump while the vehicle is in motion, compresses the coil spring and the shock absorber. The coil spring may exert a force that is a function, e.g., a linear relation, of a difference between the current length of the coil spring and a relaxed length of the coil spring. The shock absorber may exert a force that is a function of a speed of compression or extension of the shock absorber.

BRIEF DESCRIPTION OF THE DRAWINGS

FIG. 9 is a bottom view of the vehicle.

DETAILED DESCRIPTION

Figure 1:
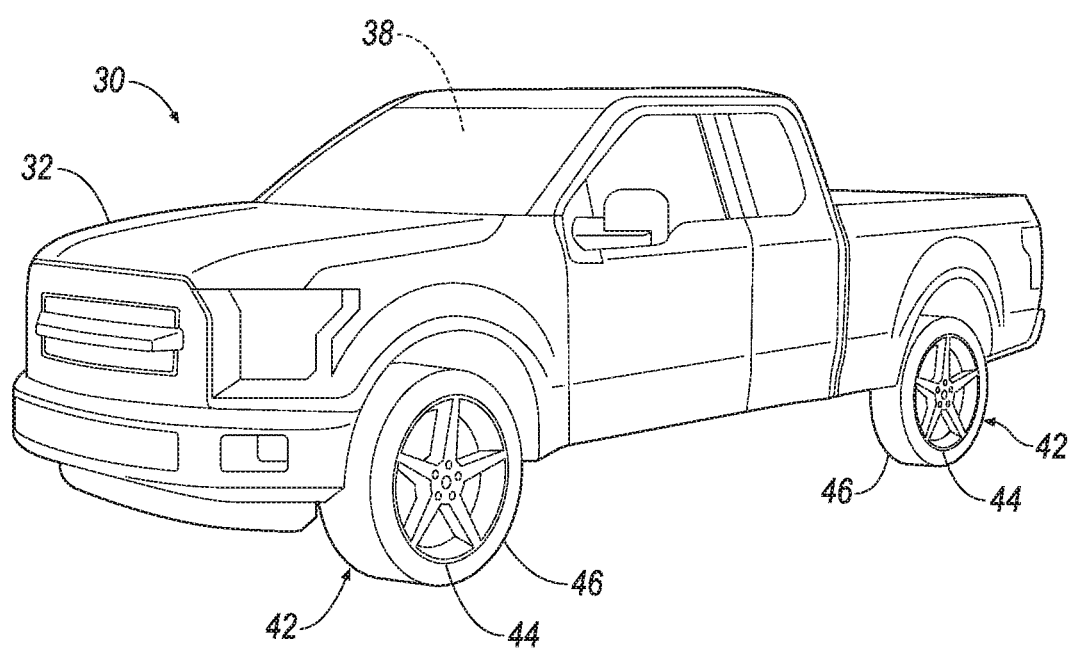
FIG. 1 is a perspective view of a vehicle.

A lower control arm includes a body including a body portion and an arm elongated from the body portion, and a sleeve having a tubular shape. The arm includes an end spaced from the body portion, a top surface, and a bottom surface opposite the top surface. The sleeve is fixed to the end. The sleeve includes a slit extending lengthwise that is disposed closer to one of the top surface and the bottom surface than to a middle of the end.

The sleeve may be welded to the end.

The arm may be a first arm, and the body may include a second arm elongated from the body portion. The end may be a first end, the top surface may be a first top surface, the bottom surface may be a first bottom surface, and the second arm may include a second end spaced from the body portion. The lower control arm may include a second top surface and a second bottom surface spaced from each other and fixed relative to the second end, and a second arcuate surface extending from the second top surface to the second bottom surface. The sleeve may be a first sleeve, and the lower control arm may include a second sleeve having a tubular shape and fixed to the second end. The slit may be a first slit, and the second sleeve may include a second slit extending lengthwise that is disposed closer to a middle of the second end than to either of the second top surface and the second bottom surface.

The first arm may be disposed in a vehicle-forward direction from the second arm.

The lower control arm may include a strut extending from the first arm to the second arm.

The lower control arm may include an upper lip extending from the end to an upper edge, and a lower lip extending from the end to a lower edge. The slit may be spaced from the upper lip and from the lower lip. The upper lip, the end, and the lower lip may define an arcuate surface extending from the upper edge to the lower edge. The arcuate surface may be shaped to mate with the sleeve.

The slit may be disposed against the end.

The body may include an upper body and a lower body connected along a seam, and the seam may extend along the body portion and may extend lengthwise along the arm to the end. The seam may extend substantially to the middle of the end.

The sleeve may include two sleeve ends and a sleeve wall having a constant cross-section extending from one of the sleeve ends to the other of the sleeve ends. The slit may extend from one of the sleeve ends to the other of the sleeve ends. The slit may extend through the sleeve wall. The sleeve wall may have a circular cross-section.

The slit may have a nonlinear shape.

A lower control arm 56 described herein may reduce the energy and/or intrusion from a frontal impact into a passenger cabin 38 of a vehicle 30. Reducing intrusion and/or energy entering the passenger cabin 38 during an impact may reduce injuries to occupants in the passenger cabin. The lower control arm 56 may detach during a frontal impact; thus, less energy is transferred rearward by the lower control arm 56, and more of the front end of the vehicle 30 is effectively a crumple zone, absorbing more energy from the impact.

Figure 2:
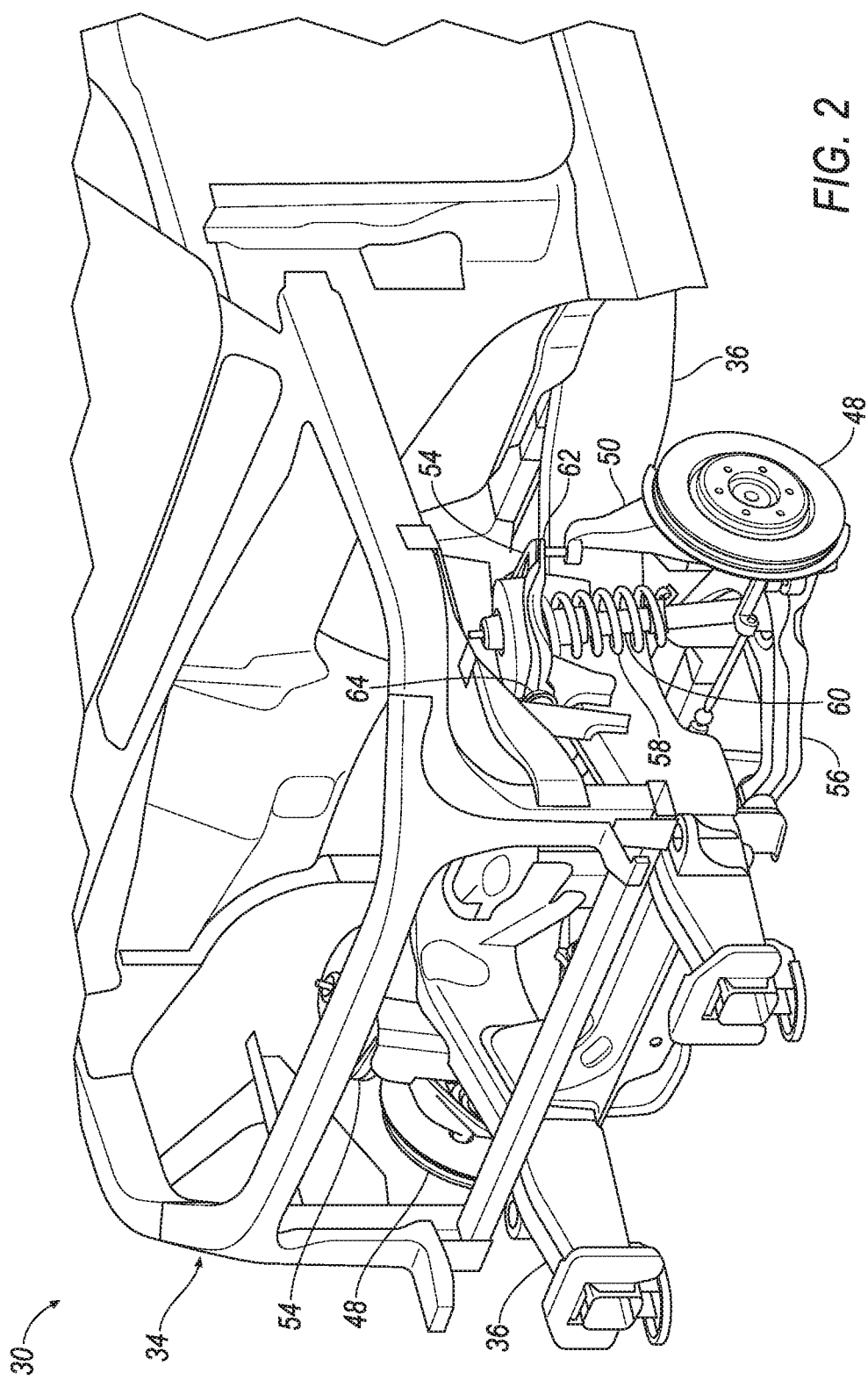
FIG. 2 is a perspective view of a portion of the vehicle with a body and wheels omitted for illustration.

With reference to FIGS. 1, 2, and 9, a vehicle 30 may include a vehicle body 32 and a vehicle frame 34. The vehicle 30 may be of a unibody construction, in which the vehicle frame 34 and the vehicle body 32 are a single component. The vehicle 30 may, alternatively, be of a body-on-frame construction, in which the vehicle frame 34 supports a vehicle body 32 that is a separate component from the vehicle frame 34. The vehicle frame 34 and vehicle body 32 may be formed of any suitable material, for example, steel, aluminum, etc. The vehicle frame 34 may include two frame rails 36 extending longitudinally relative to the vehicle 30. The vehicle 30 includes a passenger cabin 38 inside the vehicle frame 34, and the passenger cabin 38 includes a floor 40, shown from below in FIG. 9.

The vehicle 30 includes four wheel assemblies 42. Each wheel assembly 42 includes a wheel 44, a tire 46 extending circumferentially around the wheel 44, a rotor 48 to which the wheel 44 is attached, e.g., bolted, and a knuckle 50. The knuckle 50 is elongated generally vertically from a center of the rotor 48. The rotor 48 is rotatably coupled to the knuckle 50. The rotor 48, wheel 44, and tire 46 can rotate together relative to the knuckle 50.

Figure 3:
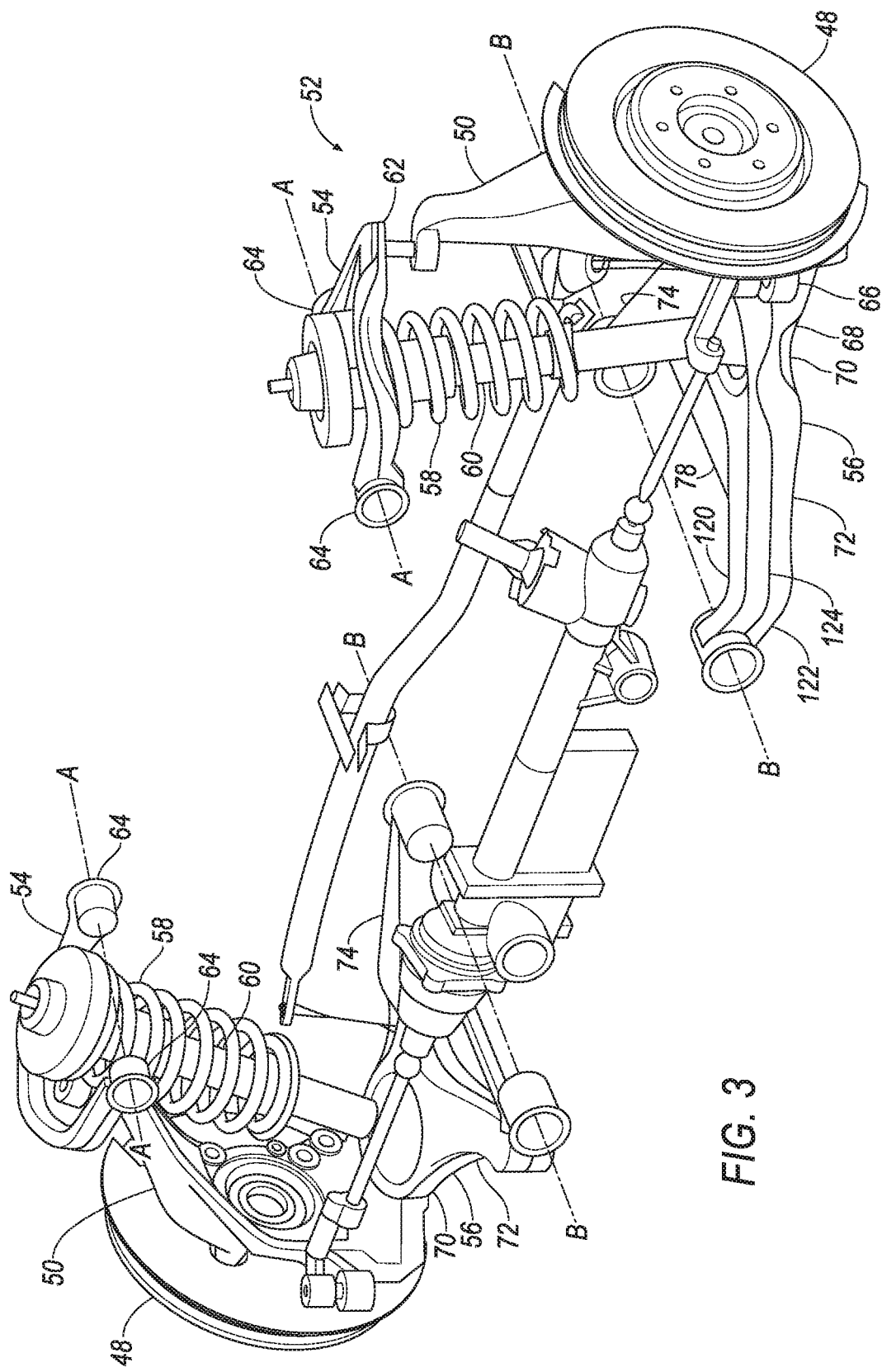
FIG. 3 is a perspective view of a suspension system of the vehicle.
Figure 4:
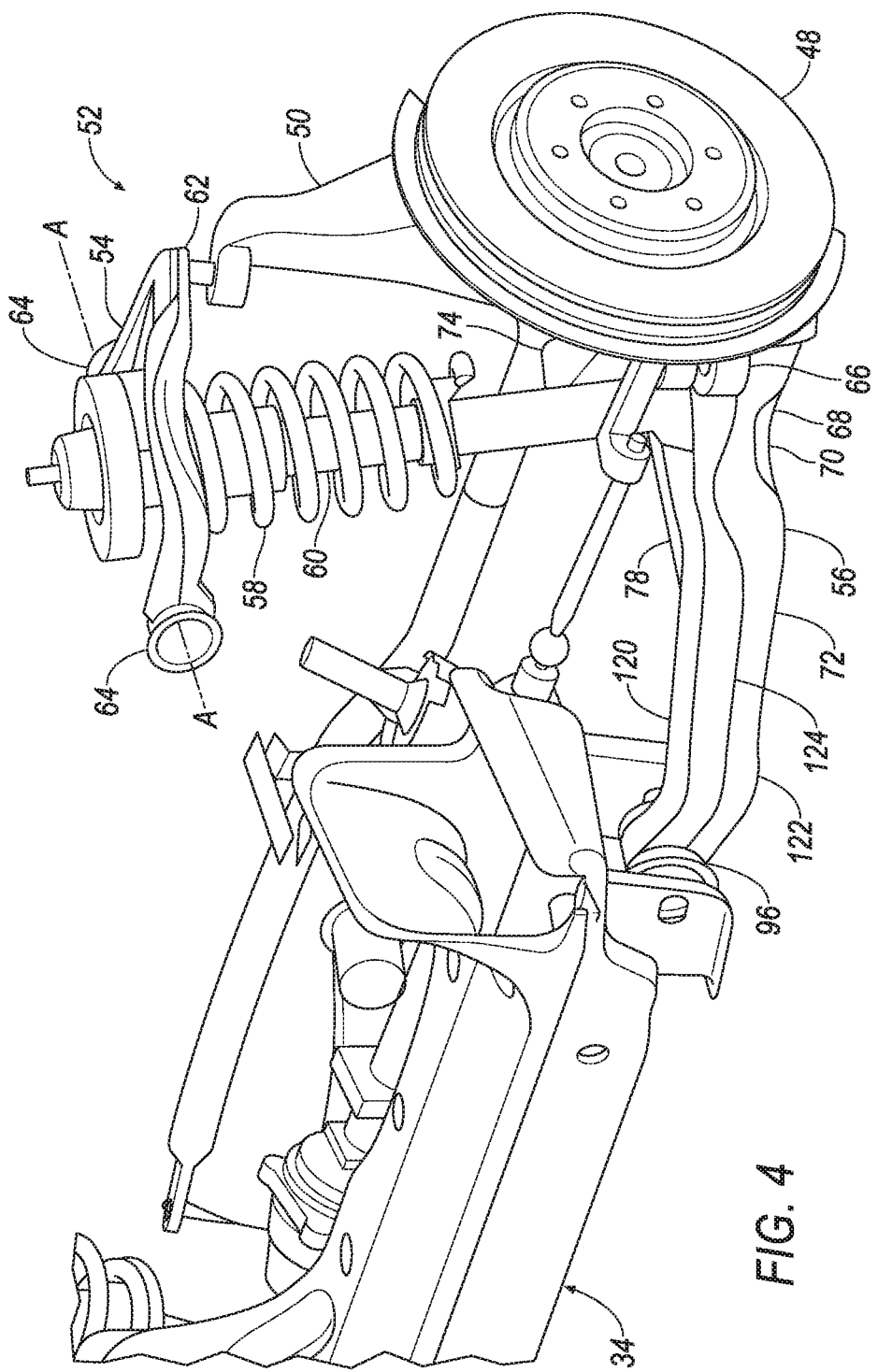
FIG. 4 is a perspective view of a portion of a frame and of the suspension system of the vehicle.

With reference to FIGS. 2-4, the vehicle 30 includes a suspension system 52. The suspension system 52 is coupled to the vehicle frame 34 and to the wheel assembly 42. The suspension system 52 absorbs and dampens shocks and vibrations from the wheel assemblies 42 to the vehicle frame 34. For each wheel assembly 42, the suspension system 52 includes an upper control arm 54, a lower control arm 56, a coil spring 58, and a shock absorber 60. The coil spring 58 has a helical shape. The shock absorber 60 extends through a center of the helical shape of the coil spring 58. One end of the shock absorber 60 and the coil spring 58 may be connected to the lower control arm 56, and the other end of the shock absorber 60 and the coil spring 58 may be connected to the upper control arm 54 or to the vehicle frame 34.

The suspension system 52 is arranged so that an upward motion of the wheel assembly 42, such as when the tire 46 hits a bump while the vehicle 30 is in motion, compresses the coil spring 58 and the shock absorber 60. The coil spring 58 may exert a force that is a function, e.g., a linear relation, of a difference between the current length of the coil spring 58 and a relaxed length of the coil spring 58. The shock absorber 60 may exert a force that is a function of a speed of compression or extension of the shock absorber 60.

The upper control arm 54 extends from the vehicle frame 34 to the knuckle 50. The upper control arm 54 may be rotatably attached to the vehicle frame 34 and rotatably attached to the knuckle 50. The upper control arm 54 may have a wishbone shape, and the upper control arm 54 may extend from a UCA knuckle connection 62 to two UCA frame connections 64. The UCA knuckle connection 62 may couple the knuckle 50 and the upper control arm 54. The UCA knuckle connection 62 may have multiple degrees of freedom, e.g., a ball joint with three rotational degrees of freedom. The UCA frame connections 64 may each have a single rotational degree of freedom about a common axis A. The axis A may extend in a generally vehicle-forward direction.

With reference to FIGS. 2-5, the lower control arm 56 may be disposed below the upper control arm 54. The lower control arm 56 extends from the vehicle frame 34, e.g., the frame rail 36, to the knuckle 50. The lower control arm 56 may be rotatably attached to the vehicle frame 34 and rotatably attached to the knuckle 50. The lower control arm 56 may be rotatably connected to the vehicle frame 34 at an axis B and have a single rotational degree of freedom about the axis B. The axis B may extend in a generally vehicle-forward direction, and the axis B may be parallel to the axis A. The lower control arm 56 may be rotatably connected to the knuckle 50 via an LCA knuckle connection 66, which may have multiple degrees of freedom, e.g., a ball joint with three rotational degrees of freedom.

Figure 5:
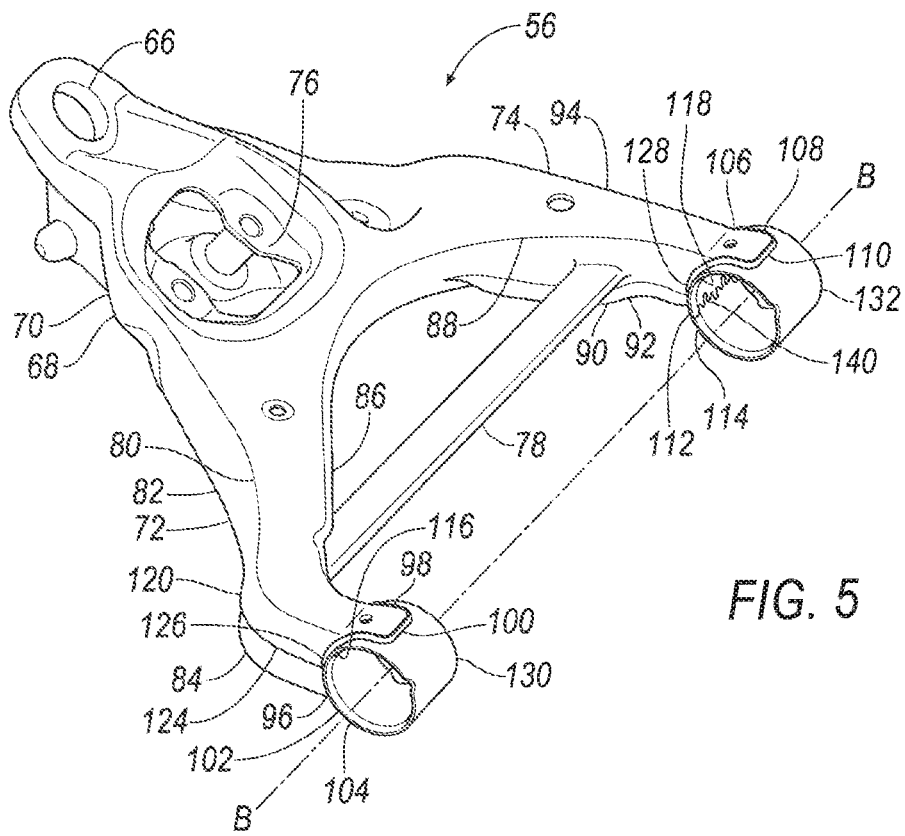
FIG. 5 is a perspective view of a lower control arm of the suspension system.

With reference to FIG. 5, the lower control arm 56 may have a body 68 having a wishbone shape. The body 68 includes a body portion 70, a first arm 72 elongated from the body portion 70, and a second arm 74 elongated from the body portion 70. (The adjectives "first" and "second" are used throughout this document as identifiers and are not intended to signify importance or order.) The body portion 70 includes a seat 76 to which the shock absorber 60 and the coil spring 58 may be attached. The body portion 70 includes the LCA knuckle connection 66. The first arm 72 may be disposed in a vehicle-forward direction from the second arm 74. A strut 78 extends and is elongated from the first arm 72 to the second arm 74. The strut 78 may be parallel to the axis B.

The first arm 72 includes a first top surface 80, a first forward surface 82, a first bottom surface 84, and a first rearward surface 86. The second arm 74 includes a second top surface 88, a second forward surface 90, a second bottom surface 92, and a second rearward surface 94. For each of the first arm 72 and the second arm 74, the top surface 80, 88 is connected to the forward surface 82, 90, which is connected to the bottom surface 84, 92, which is connected to the rearward surface 86, 94, which is connected to the top surface 80, 88. The top surfaces 80, 88 face in a generally vehicle-upward direction. The bottom surfaces 84, 92 face in a generally vehicle-downward direction. The forward surfaces 82, 90 face in a generally vehicle-forward direction. The rearward surfaces 86, 94 face in a generally vehicle-rearward direction. The top surface 80, 88 is opposite the bottom surface 84, 92. The forward surface 82, 90 is opposite the rearward surface 86, 94.

Figure 6:
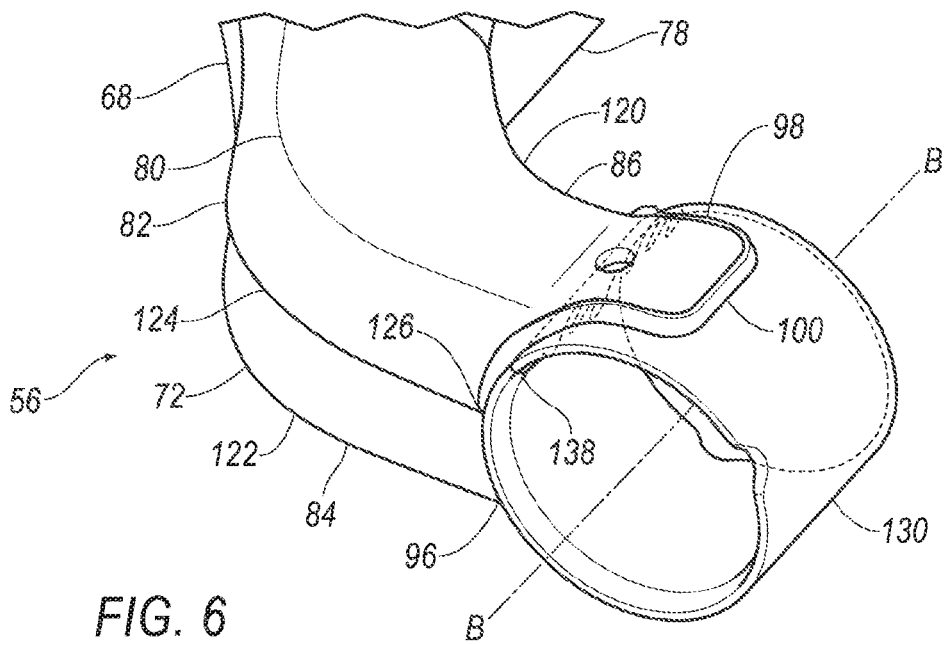
FIG. 6 is a perspective view of a portion of the lower control arm.

With reference to FIGS. 5 and 6, the first arm 72 includes a first end 96 spaced from the body portion 70, and the first arm 72 is elongated from the body portion 70 to the first end 96. A first upper lip 98 extends from the first end 96 to a first upper edge 100, and a first lower lip 102 extends from the first end 96 to a first lower edge 104. The first upper edge 100 and the first lower edge 104 are spaced from each other and fixed relative to the first end 96. The second arm 74 includes a second end 106 spaced from the body portion 70, and the second arm 74 is elongated from the body portion 70 to the second end 106. A second upper lip 108 extends from the second end 106 to a second upper edge 110, and a second lower lip 112 extends from the second end 106 to a second lower edge 114. The second upper edge 110 and the second lower edge 114 are spaced from each other and fixed relative to the second end 106. The upper and lower lips 98, 102, 108, 112 may be curved panels of constant thickness. The upper lips 98, 108 may extend upward and away from the body 68, and the lower lips 102, 112 may extend downward and away from the body 68.

Figure 8:
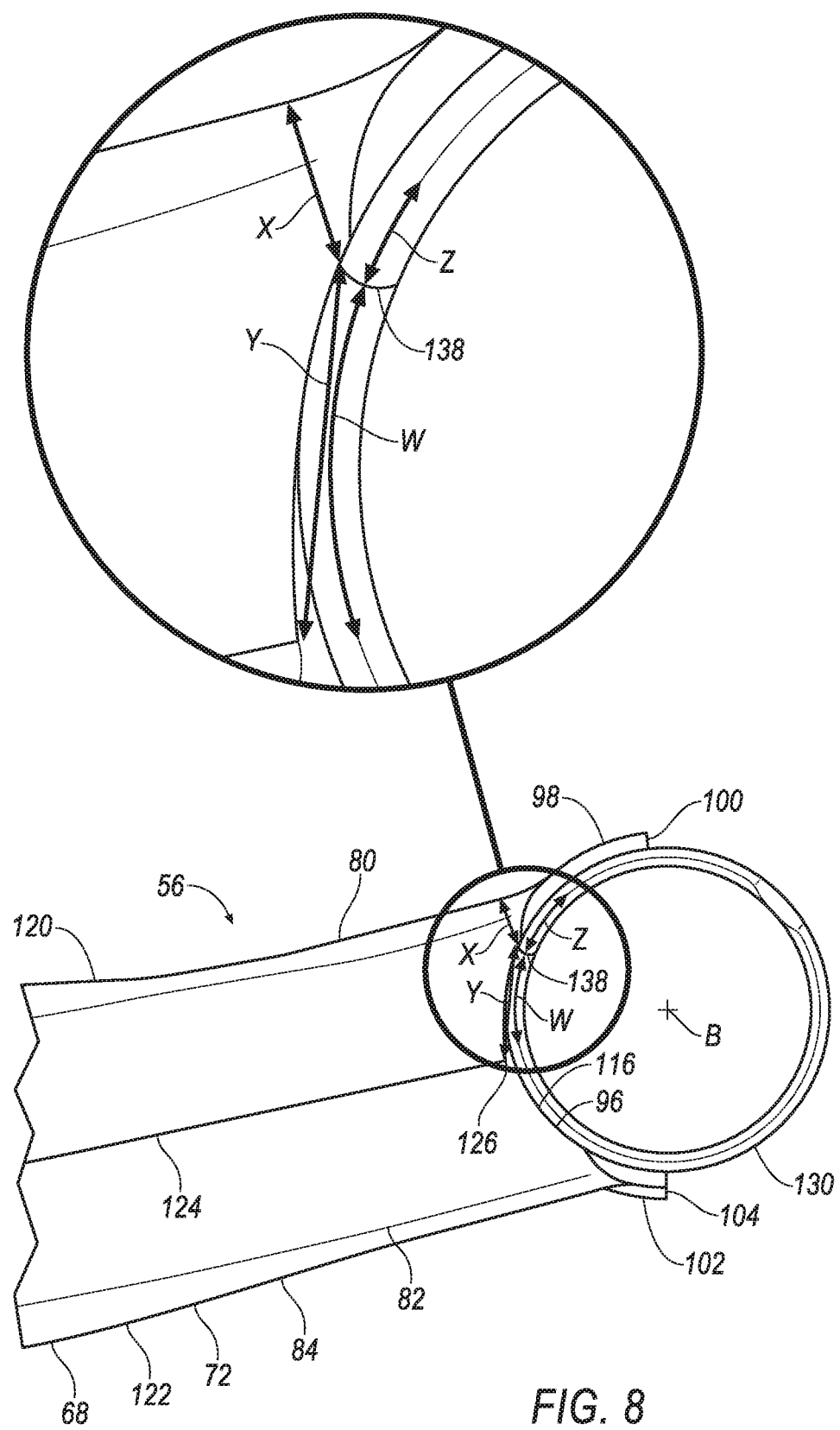
FIG. 8 is a side view of a portion of the lower control arm.

With reference to FIGS. 5, 6, and 8, a first arcuate surface 116 extends from the first upper edge 100 to the first lower edge 104. The first arcuate surface 116 may be defined by the first upper lip 98, the first end 96, and the first lower lip 102. A second arcuate surface 118 extends from the second upper edge 110 to the second lower edge 114. The second arcuate surface 118 may be defined by the second upper lip 108, the second end 106, and the second lower lip 112. The arcuate surfaces may have a partially circular shape. The first and second arcuate surfaces 116, 118 may each be curved at a constant radial distance from the axis B.

With reference to FIG. 5, the body 68 of the lower control arm 56 includes an upper body 120 and a lower body 122 connected along a seam 124. The seam 124 may divide the body 68 so that the upper body 120 and the lower body 122 may be formed by stamping, e.g., by the upper body 120 and the lower body 122 each having no overhanging or undercut sections in one direction. The seam 124 extends along the body portion 70, lengthwise along the first arm 72 on the first forward surface 82 and on the first rearward surface 86 from the body portion 70 to the first end 96, and lengthwise along the second arm 74 on the second forward surface 90 and on the second rearward surface 94 from the body portion 70 to the second end 106. The seam 124 may extend substantially to a middle 126 of the first end 96 and substantially to a middle 128 of the second end 106, as measured in a direction perpendicular to the seam 124.

With reference to FIGS. 5-8, the lower control arm 56 includes a first sleeve 130 and a second sleeve 132. The first sleeve 130 and the second sleeve 132 have tubular shapes. The sleeves each include two sleeve ends 134 and a sleeve wall 136 extending from one of the sleeve ends 134 to the other of the sleeve ends 134. The sleeve wall 136 may have a circular cross-section with a constant wall thickness, and the cross-section may be constant from one of the sleeve ends 134 to the other of the sleeve ends 134. The circular cross-section of the sleeve wall 136 may define the axis B.

With reference to FIGS. 6 and 8, the first sleeve 130 is fixed to the first end 96, and the second sleeve 132 is fixed to the second end 106. The first arcuate surface 116 is shaped to mate with the sleeve wall 136 of the first sleeve 130, and the second arcuate surface 118 is shaped to mate with the sleeve wall 136 of the second sleeve 132. More specifically, the constant radial distance from the axis B to the first arcuate surface 116 may be substantially equal to an outer radius of the first sleeve 130, and the constant radial distance from the axis B to the second arcuate surface 118 may be substantially equal to an outer radius of the second sleeve 132. The first sleeve 130 is fixed to, e.g., welded to, the first arcuate surface 116, and the second sleeve 132 is fixed to, e.g., welded to, the second arcuate surface 118.

Figure 7:
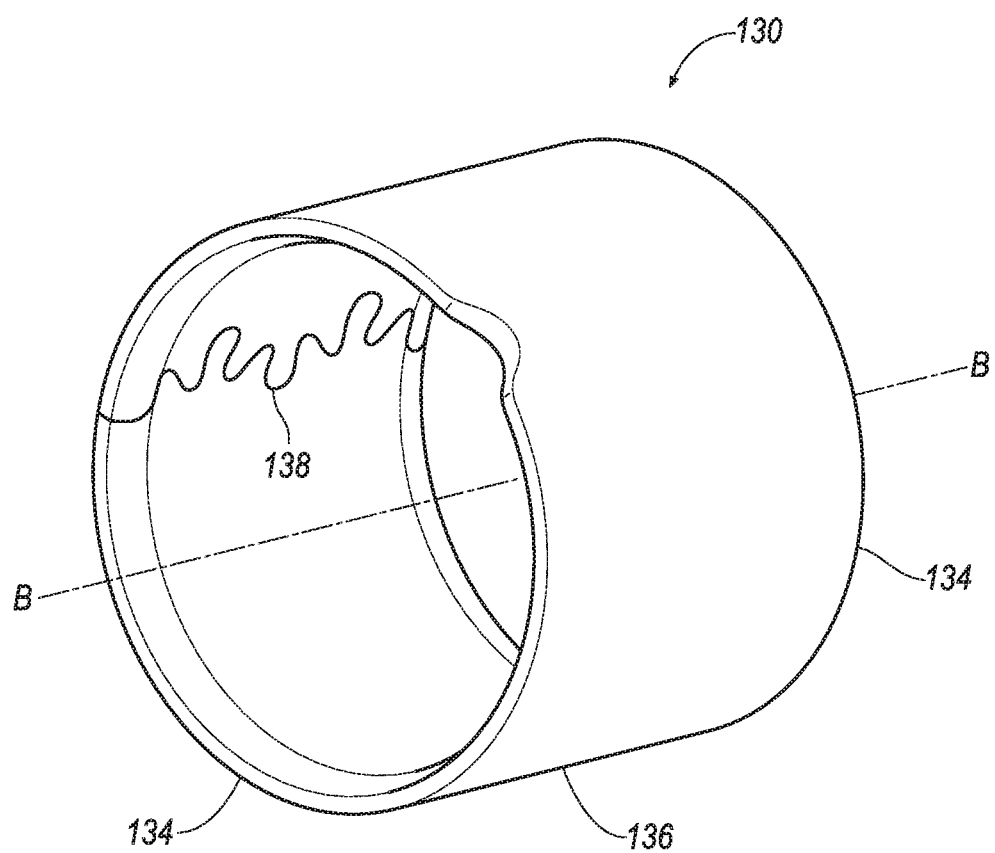
FIG. 7 is a perspective view of a sleeve of the lower control arm.

With reference to FIGS. 6-8, the first sleeve 130 includes a first slit 138 extending lengthwise from one of the sleeve ends 134 to the other of the sleeve ends 134 of the first sleeve 130, and the second sleeve 132 includes a second slit 140 extending from one of the sleeve ends 134 to the other of the sleeve ends 134 of the second sleeve 132. For the purposes of this disclosure, "lengthwise" with respect to a tubular shape means parallel to an axial direction of the tubular shape, i.e., perpendicular to the cross-section of the tubular shape. The slits 138, 140 may have nonlinear shapes, such as following a path with multiple curves or angles, in which case the direction of each of the slits 138, 140 is the direction of a straight line having a minimum average distance between the first slit 138 or second slit 140 and the straight line. The nonlinear shape of the slits 138, 140 may help align the sleeves 130, 132 during installation by only mating properly with no offset between the portion of the sleeve 130, 132 on one side of the slit 138, 140 and the portion of the sleeve 130, 132 on the other side of the slit 138, 140.

With reference to FIG. 8, the first slit 138 is spaced from the first upper edge 100 and from the first lower edge 104. The first slit 138 may be disposed against the first end 96 of the first arm 72, and the first slit 138 may be spaced from the first upper lip 98 and from the first lower lip 102. The first slit 138 is disposed closer to one of the first top surface 80 and the first bottom surface 84 than to the middle 126 of the first end 96. In other words, as shown in FIG. 8, a shortest distance X from the first top surface 80 to the first slit 138 is less than a shortest distance Y from the first slit 138 to the middle 126 of the first end 96. The first slit 138 may be disposed closer along the first arcuate surface 116 to one of the first upper lip 98 and the first lower lip 102 than to the middle 126 of the first end 96. In other words, as shown in FIG. 8, a shortest circumferential distance Z from the first upper lip 98 to the first slit 138 is less than a shortest circumferential distance W from the first slit 138 to the middle 126 of the first end 96. Alternatively or additionally, the first slit 138 may be disposed substantially at 60° from the middle 126 of the first end 96 about the axis B.

With reference to FIG. 5, the second slit 140 is spaced from the second upper edge 110 and from the second lower edge 114. The second slit 140 may be disposed against the second end 106 of the second arm 74, and the second slit 140 may be spaced from the second upper lip 108 and from the second lower lip 112. The second slit 140 may be disposed closer to the middle 128 of the second end 106 than to either of the second top surface 88 and the second bottom surface 92. The second slit 140 may be disposed closer along the second arcuate surface 118 to the middle 128 of the second end 106 than to either of the second upper lip 108 and the second lower lip 112.

The first slit 138 and the second slit 140 may thus have different rotational alignments relative to the middles 126, 128 of the arms 72, 74. During an impact, the first sleeve 130 may separate from the vehicle frame 34 more easily, i.e., at a lower force, than the second sleeve 132 separates from the vehicle frame 34. The first slit 138 is designed to separate at a first threshold force, and the second slit 140 is designed to separate at a second threshold force. The second threshold force may be higher than experienced in any testing scenario; in other words, the second sleeve 132 is designed to not separate under standard testing protocols. The first threshold force is less than the second threshold force. The first threshold force is associated with a frontal impact to the vehicle 30. Specifically, the thickness of the first sleeve 130, the material type of the first sleeve 130, the position of the first slit 138, the welding of the first sleeve 130 to the first arcuate surface 116, etc. are designed to allow for the separation from the vehicle frame 34 at the first threshold force.

With reference to FIG. 9, in the event of an impact to a front end of the vehicle 30, a first crumple zone 142 of the vehicle 30 may deform by being compressed along the vehicle-forward direction. The first crumple zone 142 extends from the forward-most end of the vehicle 30 to the first ends 96 of the lower control arms 54. Then, a force of the impact may cause the first sleeves 130 to detach from the vehicle frame 34; specifically, the welding between the first slits 138 and the first upper edges 100 may break, and/or the first upper lips 98 may break, and the first sleeves 130 may deform by opening at the first slits 138. The force of the impact may be able to detach the first sleeves because of the location of the first slits 138 closer to the first top surfaces 80 or first bottom surfaces 84 than to the middles 126 of the first ends 96, such as at 60° from the middles 126 of the first ends 96 about the axis B. Once the first sleeves 130 detach, a second crumple zone 144 may deform by being compressed along the vehicle-forward direction, and if the second crumple zone 144 fully deforms, then a third crumple zone 146 may deform along the vehicle-forward direction. The second crumple zone 144 extends from the first ends 96 of the lower control arms 54 to the second ends 106 of the lower control arms 54, and the third crumple zone 146 extends from the second ends 106 of the lower control arms 54 to the floor 40 of the passenger cabin 38. The detaching of the first ends 96 of the lower control arms 54 may allow the second crumple zone 144 to absorb more energy from the impact. The detaching of the first ends 96 may thus reduce the force of the impact transferred to the passenger cabin 38. Moreover, during a lower-speed impact, which may have a minimal chance of intrusion into the passenger cabin 38, the first sleeves 130 may remain attached to the vehicle frame 34.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A lower control arm comprising:
   a body including a body portion and an arm elongated from the body portion, the arm including an end spaced from the body portion, a top surface, and a bottom surface opposite the top surface; and a sleeve having a tubular shape and fixed to and at the end, the sleeve including a slit extending lengthwise that is disposed closer to one of the top surface and the bottom surface than to a middle of the end;

wherein the longest length of the arm is from the body portion to the sleeve; and the slit is disposed against the end.

2. The lower control arm of claim 1, wherein the sleeve is welded to the end.

3. The lower control arm of claim 1, wherein the arm is a first arm, and the body includes a second arm elongated from the body portion.

4. The lower control arm of claim 3, wherein the end is a first end, the top surface is a first top surface, the bottom surface is a first bottom surface, and the second arm includes a second end spaced from the body portion, the lower control arm further comprising a second top surface and a second bottom surface spaced from each other and fixed relative to the second end, and a second arcuate surface extending from the second top surface to the second bottom surface.

5. The lower control arm of claim 4, wherein the sleeve is a first sleeve, the lower control arm further comprising a second sleeve having a tubular shape and fixed to the second end.

6. The lower control arm of claim 5, wherein the slit is a first slit, and the second sleeve includes a second slit extending lengthwise that is disposed closer to a middle of the second end than to either of the second top surface and the second bottom surface.

7. The lower control arm of claim 3, wherein the first arm is disposed in a vehicle-forward direction from the second arm.

8. The lower control arm of claim 1, further comprising an upper lip extending from the end to an upper edge, and a lower lip extending from the end to a lower edge.

9. The lower control arm of claim 8, wherein the slit is spaced from the upper lip and from the lower lip.

10. The lower control arm of claim 8, wherein the upper lip, the end, and the lower lip define an arcuate surface extending from the upper edge to the lower edge.

11. The lower control arm of claim 10, wherein the arcuate surface is shaped to mate with the sleeve.

12. The lower control arm of claim 1, wherein the body includes an upper body and a lower body connected along a seam, the seam extending along the body portion and extending lengthwise along the arm to the end.

13. The lower control arm of claim 12, wherein the seam extends substantially to the middle of the end.

14. The lower control arm of claim 1, wherein the sleeve includes two sleeve ends and a sleeve wall having a constant cross-section extending from one of the sleeve ends to the other of the sleeve ends.

15. The lower control arm of claim 14, wherein the slit extends from one of the sleeve ends to the other of the sleeve ends.

16. The lower control arm of claim 14, wherein the slit extends through the sleeve wall.

17. The lower control arm of claim 14, wherein the sleeve wall has a circular cross-section.

18. The lower control arm of claim 17, wherein the cross-section of the sleeve wall defines an axis, and the slit is disposed substantially at 60° from the middle of the end about the axis.

19. The lower control arm of claim 1, wherein the slit has a nonlinear shape.

20. A lower control arm comprising:

a body including a body portion, a first arm elongated from the body portion, and a second arm elongated from the body portion, the first arm including a first end spaced from the body portion, a first top surface, and a first bottom surface opposite the first top surface, the second arm including a second end spaced from the body portion, a second top surface, and a second bottom surface, the second top surface and second bottom surface spaced from each other and fixed relative to the second end, and a second arcuate surface extending from the second top surface to the second bottom surface;

a first sleeve having a tubular shape and fixed to and at the first end, the first sleeve including a first slit extending lengthwise that is disposed closer to one of the first top surface and the first bottom surface than to a middle of the first end; and a second sleeve having a tubular shape and fixed to the second end, the second sleeve including a second slit extending lengthwise that is disposed closer to a middle of the second end than to either of the second top surface and the second bottom surface;

wherein the longest length of the first arm is from the body portion to the sleeve.

21. A lower control arm comprising:

a body including a body portion and an arm elongated from the body portion, the arm including an end spaced from the body portion, a top surface, and a bottom surface opposite the top surface;

a sleeve having a tubular shape and fixed to and at the end, the sleeve including a slit extending lengthwise that is disposed closer to one of the top surface and the bottom surface than to a middle of the end;

an upper lip extending from the end to an upper edge;

a lower lip extending from the end to a lower edge;

wherein the longest length of the arm is from the body portion to the sleeve.

22. A lower control arm comprising:

a body including a body portion and an arm elongated from the body portion, the arm including an end spaced from the body portion, a top surface, and a bottom surface opposite the top surface; and a sleeve having a tubular shape and fixed to and at the end, the sleeve including a slit extending lengthwise that is disposed closer to one of the top surface and the bottom surface than to a middle of the end;

wherein the longest length of the arm is from the body portion to the sleeve;

the sleeve includes two sleeve ends and a sleeve wall having a constant circular cross-section extending from one of the sleeve ends to the other of the sleeve ends;

the cross-section of the sleeve wall defines an axis; and the slit is disposed substantially at 60° from the middle of the end about the axis.

\* \* \* \* \*